(12) United States Patent
Burek et al.

(10) Patent No.: US 9,632,267 B1
(45) Date of Patent: Apr. 25, 2017

(54) COMPACT POINT-OF-ENTRY FIBER STORAGE MODULE

(71) Applicant: OFS Fitel, LLC, Norcross, GA (US)

(72) Inventors: Denis E Burek, Cumming, GA (US); Jimmy Joy, Lawrenceville, GA (US); Willard C White, Suwanee, GA (US); John Pacholski, Dallas, TX (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/162,697

(22) Filed: May 24, 2016

Related U.S. Application Data

(60) Provisional application No. 62/318,445, filed on Apr. 5, 2016.

(51) Int. Cl.
 *G02B 6/44* (2006.01)
 *G02B 6/38* (2006.01)
(52) U.S. Cl.
 CPC ......... *G02B 6/4442* (2013.01); *G02B 6/3825* (2013.01); *G02B 6/3897* (2013.01); *G02B 6/4478* (2013.01)
(58) Field of Classification Search
 USPC ....................................................... 385/135
 See application file for complete search history.

(56) References Cited

U.S. PATENT DOCUMENTS

| 8,906,178 | B2 | 12/2014 | Burek et al. | |
|---|---|---|---|---|
| 9,261,663 | B2 * | 2/2016 | Loeffelholz | .......... G02B 6/4453 |
| 2010/0272407 | A1 | 10/2010 | Weaver | |
| 2010/0329621 | A1 | 12/2010 | Makrides-Saravanos et al. | |
| 2011/0200294 | A1 * | 8/2011 | Case | .................... G02B 6/3825 |
| | | | | 385/135 |
| 2012/0294580 | A1 | 11/2012 | Burek et al. | |
| 2015/0147061 | A1 | 5/2015 | Burek et al. | |
| 2015/0355428 | A1 * | 12/2015 | Leeman | ............... G02B 6/4455 |
| | | | | 385/135 |
| 2016/0033733 | A1 | 2/2016 | Burek et al. | |
| 2016/0097911 | A1 | 4/2016 | George et al. | |

FOREIGN PATENT DOCUMENTS

| EP | 2068185 A1 | 6/2009 |
|---|---|---|
| FR | 2917183 A1 | 12/2008 |
| WO | 2005096054 A1 | 10/2005 |
| WO | 2009076536 A1 | 6/2009 |

* cited by examiner

*Primary Examiner* — Eric Wong
(74) *Attorney, Agent, or Firm* — Leo Zucker

(57) ABSTRACT

A compact point-of-entry fiber storage module includes a base, and a cover arranged to be fastened to the base for enclosing optical fibers when routed inside the module for storage. The base is constructed and arranged to mount a connector adapter at a selected one of multiple positions with respect to the base. The adapter has an axis, and first and second ports at opposite axial ends of the adapter. When the adapter is mounted at a selected position, optical fibers of various lengths that are routed and retained over the base for storage can connect to corresponding ports at the ends of the adapter without bending the fibers beyond a specified critical limit.

16 Claims, 5 Drawing Sheets

COMPACT POINT-OF-ENTRY FIBER STORAGE MODULE

CROSS REFERENCE TO RELATED APPLICATION

This application claims priority under 35 U.S.C. §119(e) from U.S. Provisional Patent Application No. 62/318,445 filed Apr. 5, 2016, titled "Compact Point of Entry Multiple Dwelling Unit InvisilLight Module," the entire contents of which are incorporated by reference.

BACKGROUND OF THE INVENTION

Field of the Invention

The present invention relates to modules or boxes for storing lengths of optical fibers, and particularly to modules arranged to enable fibers that are stored or routed to the modules to connect to one another inside the modules.

Discussion of the Known Art

A method and materials for installing a bundle of optical fibers associated with a network through a hallway inside a multi-dwelling unit (MDU) building so that living units along the hallway can connect to the network, are offered by OFS Fitel, LLC under the registered mark InvisiLight®. See U.S. Pub. No. 2016/0097911 (Apr. 7, 2016), and U.S. Pat. No. 8,906,178 (Dec. 9, 2014), both of which are incorporated by reference.

Specifically, a covered bundle of network fibers is bonded to a wall or other supporting surface in the hallway via a commercially available adhesive, usually at or near the ceiling over a predefined installation path. The bundle cover is cut open at locations that correspond to each living unit to which one of the fibers has been assigned. At each location, a length of the assigned fiber is retrieved through the cover opening, and stored in a point-of-entry (POE) module that is often mounted, e.g., over an entrance door of the associated living unit. The stored fiber is terminated in an optical connector which in turn is connected to one of two ports of a connector adapter inside the module. Occupants of the living unit can access the assigned network fiber by routing a drop fiber from inside the unit through the hallway wall and into the module, terminating the drop fiber in a connector, and connecting the drop fiber to the other port of the adapter inside the module.

POE fiber storage modules for use in the mentioned InvisiLight procedure are currently available from OFS Fitel, LLC, with connector adapters, as Part No. 301107454 (SCA adapter) and Part No. 301107447 (LCA adapter). The '454 module is illustrated herein in FIGS. 1 and 2. Fiber storage modules for use in fiber-to-the-home (FTTH) and fiber-to-the business (FTTB) installations other than InvisiLight are also commercially available. See, e.g., U.S. Pubs. No. 2016/0033733 (Feb. 4, 2016); No. 2012/0294580 (Nov. 22, 2012); and No. 2015/0147061 (May 28, 2015), all of which are incorporated by reference.

The POE fiber storage module 10 shown in FIGS. 1 and 2 includes a generally rectangular base 12 and a cover 14. The cover 14 is dimensioned and configured to snap or otherwise fasten securely onto the base 12 to enclose and store lengths of optical fibers when routed and retained over the area of the base, and a connector adapter 16 mounted on the base. Both the base 12 and the cover 14 are preferably formed of a non-flammable plastics material such as, e.g., polypropylene to meet all applicable building codes.

In the module 10, the adapter 16 is inserted between a pair of opposed tabs or guides 18, 20 that project upward from the base 12 to form a bracket or slot 22 within which the adapter 16 is mounted at a fixed position midway between the short side edges 12a, 12b of the base. In FIG. 1, the adapter 16 has a generally rectangular solid shape with a long axis A, and first and second ports 17a, 17b. Vertical flanges 16a, 16b project from opposite side walls of the adapter 16, intermediate the first and the second ports 17a, 17b. The tabs 18, 20 on the base 12 form corresponding guideways 18a, 20a on opposite sides of the bracket 22, for receiving and seating the flanges 16a, 16b at the sides of the adapter 16 when the adapter is inserted in the bracket 22. Typical dimensions of the module 10 are, approximately, a length L of 5.25 inches, a height H of 2.5 inches, and a depth D of 0.770 inch.

In use, an opening is formed in the hallway wall to provide a passage for an end length of a drop fiber that originates from and is terminated inside the living unit associated with the module 10. The module is mounted on the hallway wall so that the passage for the drop fiber coincides with an opening 24 in the module base 12. The fiber bundle installed along the hallway is routed to pass through the module 10, between the short side edges 12a, 12b of the module base 12 and next to an upper edge 12c of the base.

A network fiber assigned to the living unit is retrieved from the fiber bundle, through an opening that is cut in the bundle cover between the side edges 12a, 12b of the base. The fiber is then preferably inserted through a thin plastics sleeve or tube to avoid damage while being handled, and dressed about a series of retaining fingers or tabs 28 that project upward from the base 12. The free end of the fiber is terminated in an optical connector and connected to one of the connecter ports 17a, 17b at one end of the adapter 16. The module cover 14 is then fastened to the base 12, and the cover 14 is opened when occupants of the living unit subscribe to network service and need to connect to the stored network fiber. The drop fiber is then routed from inside the living unit, through the passage in the hallway wall and the opening 24 in the module base 12, terminated, and connected to the other one of the ports 17b, 17a at the opposite end of the adapter 16.

Because the present dimensions of the module 10 can sometimes create a negative impact visually when a number of the modules are installed along a hallway wall and seen all at once, a need for a smaller size module has arisen. Reducing the overall size of the module 10 could, however, make it difficult to dress or manage a fiber properly for storage inside the module without bending the fiber beyond a critical degree which damages or impairs the performance of the fiber. That is, if the present dimensions of the module 10 are simply reduced, it may not always be possible to connect a fiber routed inside the module for storage to a port of the adapter 16, without having to bend the fiber beyond a specified critical limit. See FIGS. 5 and 7, and related description below.

SUMMARY OF THE INVENTION

According to the invention, an optical fiber storage module includes a base, and a cover constructed and arranged to be fastened to the base for enclosing optical fibers when stored inside the module. The base is constructed and formed to mount a connector adapter at a selected one of multiple positions with respect to the base, wherein the adapter has an axis and first and second ports at axially opposite ends of the adapter. When the adapter is mounted at one of the positions, optical fibers of various lengths that are routed about the base for storage can connect to corresponding ports at the ends of the adapter without bending the fibers beyond a specified critical limit.

For a better understanding of the invention, reference is made to the following description taken in conjunction with the accompanying drawing and the appended claims.

BRIEF DESCRIPTION OF THE DRAWING FIGURES

Figure 8:
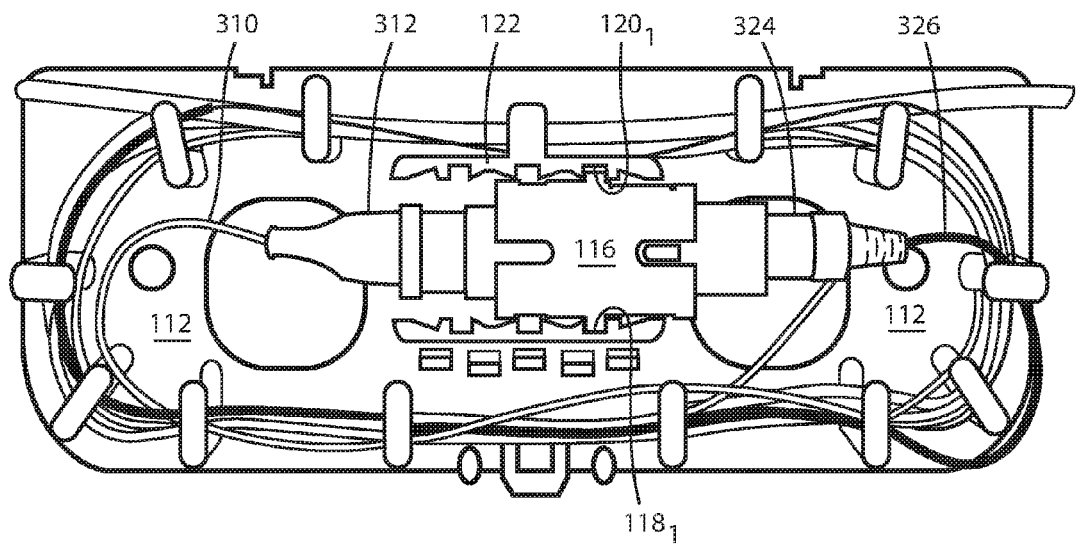
Figure 9:
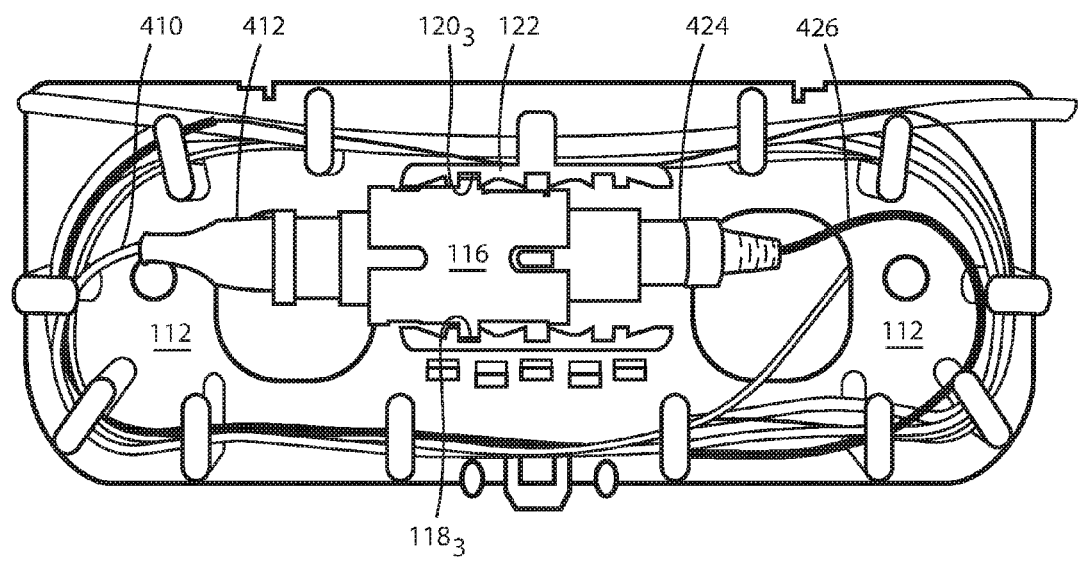

FIG. 8 is a view of the inventive module with the cover removed to expose a second stored network fiber and a second stored drop fiber, wherein the adapter is mounted on the base at the first position; and FIG. 9 is a view of the inventive module with the cover removed to expose a third stored network fiber and a third stored drop fiber, wherein the adapter is mounted on the base at the third position.

DETAILED DESCRIPTION OF THE INVENTION

Figure 1:
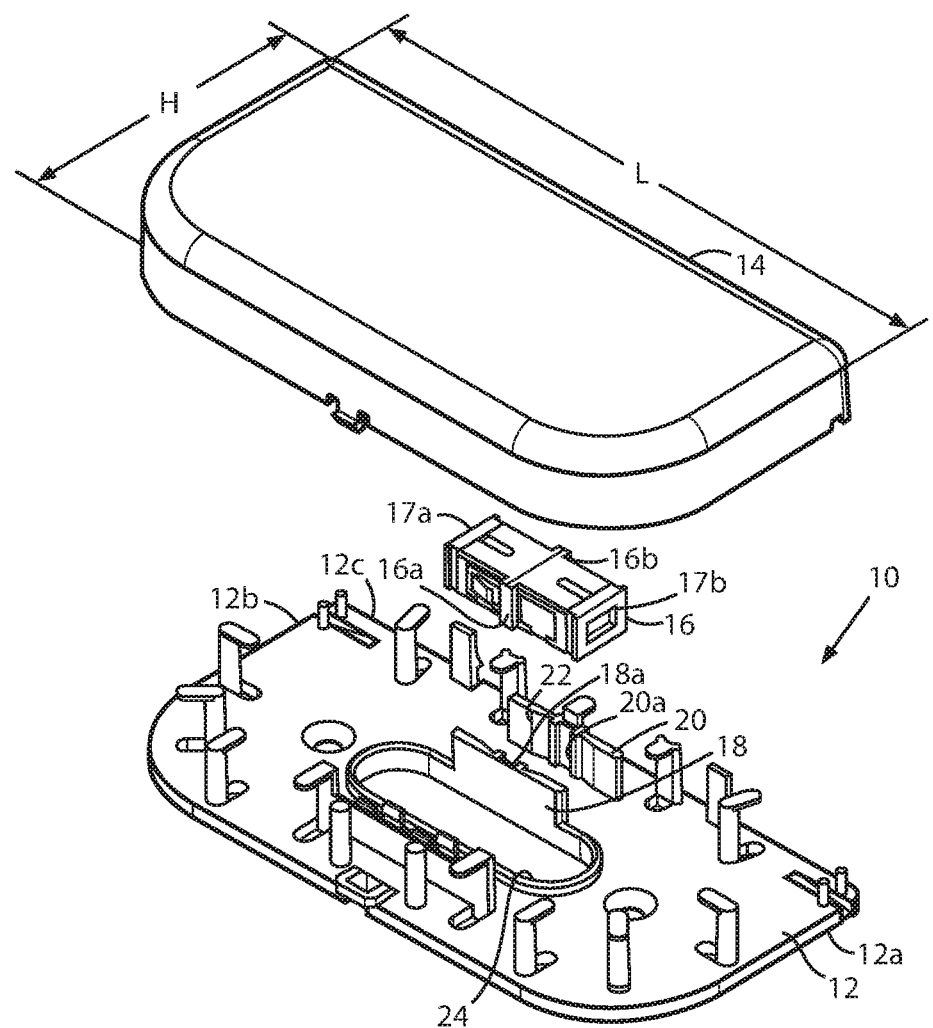
FIG. 1 is an assembly view of a commercially available point-of-entry (POE) fiber storage module.
Figure 2:
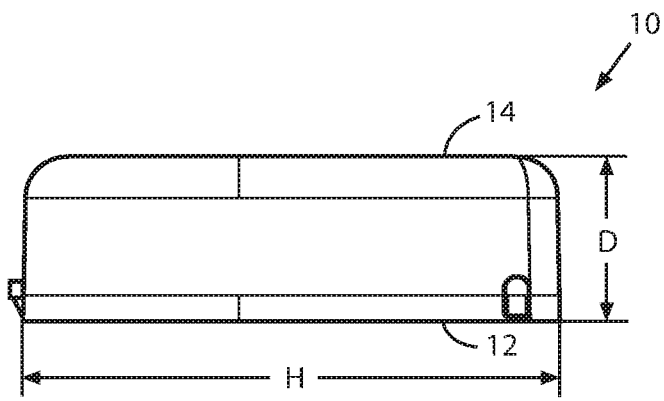
FIG. 2 is an end view of the storage module in FIG. 1.
Figure 3:
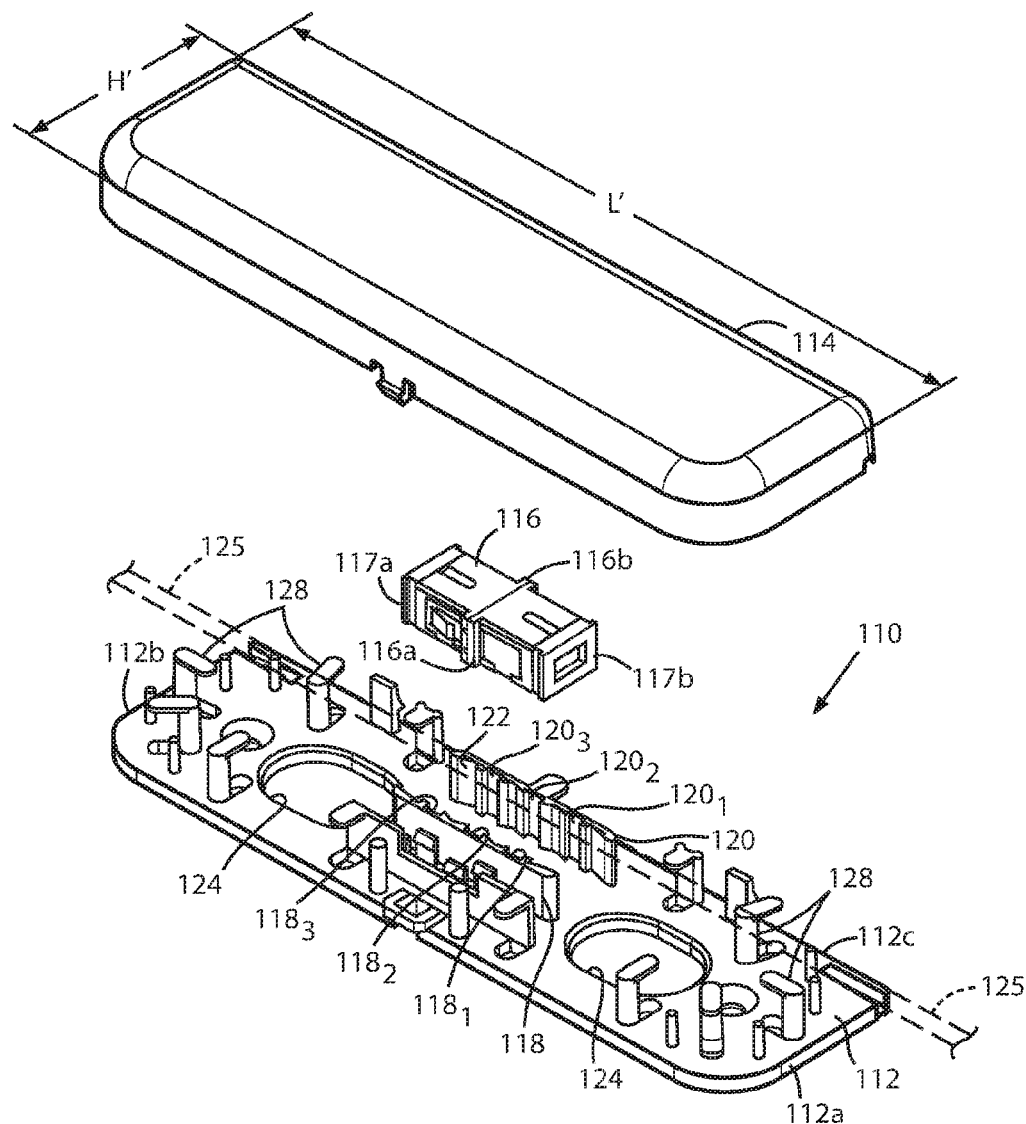
FIG. 3 is an assembly view of a POE fiber storage module according to the invention, and a connector adapter mounted on a base of the module.
Figure 4:
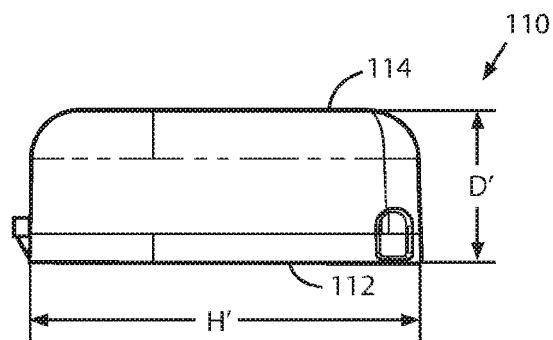
FIG. 4 is an end view of the inventive storage module in FIG. 3.

FIG. 3 is an assembly view of a point-of-entry (POE) fiber storage module 110 according to the invention, and FIG. 4 is an end view of the module 110 in FIG. 3. Components of the inventive storage module 110 are identified with the same reference numerals as corresponding components of the module 10 in FIGS. 1 and 2, increased by 100.

The fiber storage module 110 has a generally rectangular base 112 and a cover 114. The cover 114 is dimensioned and formed to snap or otherwise fasten securely onto the base 112 to enclose optical fibers that are routed and retained over the area of the base 112 for storage, and a connector adapter 116 that is mounted in a bracket or slot 122 provided on the base 112. The base 112 and the cover 114 of the module 110 are preferably formed of a non-flammable plastics material such as, e.g., polypropylene, in order to comply with applicable building codes.

The adapter 116 is mounted between a pair of opposed tabs or guides 118, 120 that project upward from the base 112 to form the bracket or slot 122. The adapter 116 is generally rectangular solid in shape having a long axis A, and first and second ports 117a, 117b at axially opposite ends of the adapter. Vertical flanges 116a, 116b project from opposite side walls of the adapter 116, intermediate the first and the second ports.

The bracket or slot 122 has three pairs of opposed guideways $118_1$, $120_1$; $118_2$, $120_2$; and $118_3$, $120_3$; wherein the guideways are formed in the opposed tabs 118, 120. In the present embodiment, each pair of opposed guideways corresponds to a different one of three positions at which the adapter 116 can be mounted with respect to the base 112 when the adapter flanges 116a, 116b are inserted and seated in the pair. The overall dimensions of the closed module 110 are, approximately, a length L of 6.0 inches, a height H of 1.6 inches (i.e., about one inch less than module 10), and a depth D of 0.625 inch (i.e., 0.145 inch less than the module 10).

It has been discovered that if the distance between adjacent ones of the positions at which the adapter 116 can be mounted in the bracket 122 on the module base 112 is about 0.375 inch in the axial direction of the adapter, and when the adapter is mounted at a selected one of the positions, it is possible to route stored network and drop fibers of various lengths to connect to the ports 117a, 117b at the ends of the adapter 116 without bending the fibers to a critical degree beyond which the fibers are likely to be damaged or impaired. See FIGS. 6, 8, and 9.

It is also contemplated if the distance between adjacent positions at which the adapter 116 can be mounted in the axial direction is other than 0.375 inch, or if the bracket 122 is formed so that the adapter 116 can be mounted at a number of positions other than three, it will also be possible to route and connect stored fibers of various lengths safely to the adapter ports 117a, 117b when the adapter is mounted at one of the positions.

In use, an opening is formed in the hallway wall to provide a through passage for the drop fiber from the living unit associated with the module 110. The module is mounted on the wall so that one of two openings 124 in the left and right sides of the module base 112 in FIG. 3 coincide with the wall opening for the drop fiber. A network fiber bundle 125 is directed to pass through the module 110, between the short side edges 112a, 112b of the base 112, and next to an upper edge 112c of the base.

A network fiber that has been assigned to the living unit is retrieved through an opening in the bundle cover, between the side edges 112a, 112b of the module base. The fiber is preferably inserted through a thin plastics cylindrical sleeve or tube to protect it from damage while being handled, and then routed for storage about a series of retaining fingers or tabs 128 that project upward from the base 112. The free end of the network fiber is terminated in an optical connector which in turn is connected to one of the ports 117a, 117b at an end of the adapter 116. The module cover 114 is fastened to the base 112, and the cover is removed when occupants of the living unit subscribe to network service and need to access the stored network fiber. At that time, the drop fiber is routed from inside the living unit, through the opening in the hallway wall and the coincident opening 124 in the module base 112, terminated, and connected to the other one of ports 117b, 117a at the opposite end of the adapter 116.

Figure 5:
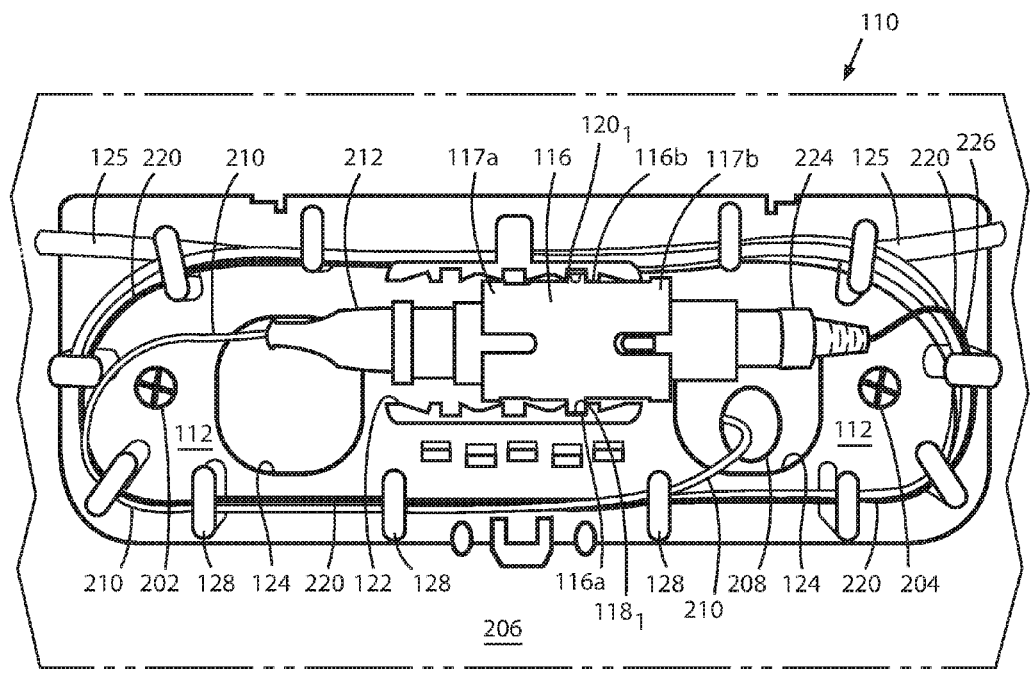
FIG. 5 is a view of the inventive module in FIG. 3 mounted on a wall and with a cover removed to expose a first stored network fiber and a first stored drop fiber, wherein the adapter is mounted on the base at a first position.

FIG. 5 shows the inventive fiber storage module 110 with the cover 114 removed, and the base 112 mounted with two screws 202, 204 on a hallway wall 206. In FIG. 5, the opening 124 in the right side of the module base 112 coincides with an opening 208 in the wall 206 through which a drop fiber 210 is routed from a living unit on the opposite side of the wall into the module 110. In FIG. 5, the connector adapter 116 is mounted in the bracket 122 on the module base with the adapter flanges 116a, 116b inserted in a first pair of opposed guideways $118_1$, $120_1$ at the sides of the bracket. Thus, as illustrated in FIG. 5, the adapter 116 is fixed at a first position to the right of center on the base 112.

Note that when the adapter 116 is at the first position in FIG. 5, and the drop fiber 210 is routed about the retaining fingers 128 on the base 112 and terminated in a first connector 212, it is possible to connect the drop fiber to the first port 117a at the left end of the adapter 116 without bending the fiber sharply as it approaches the port 117a in the axial direction from the left in FIG. 5. On the other hand, when a network fiber 220 is removed from the bundle 125, routed for storage about the fingers 128 and terminated in a second connector 224, the network fiber 220 must bend sharply (at 226) in order to connect to the second port 117b at the right end of the adapter 116 as the fiber 220 approaches the port from the right in FIG. 5.

Figure 6:
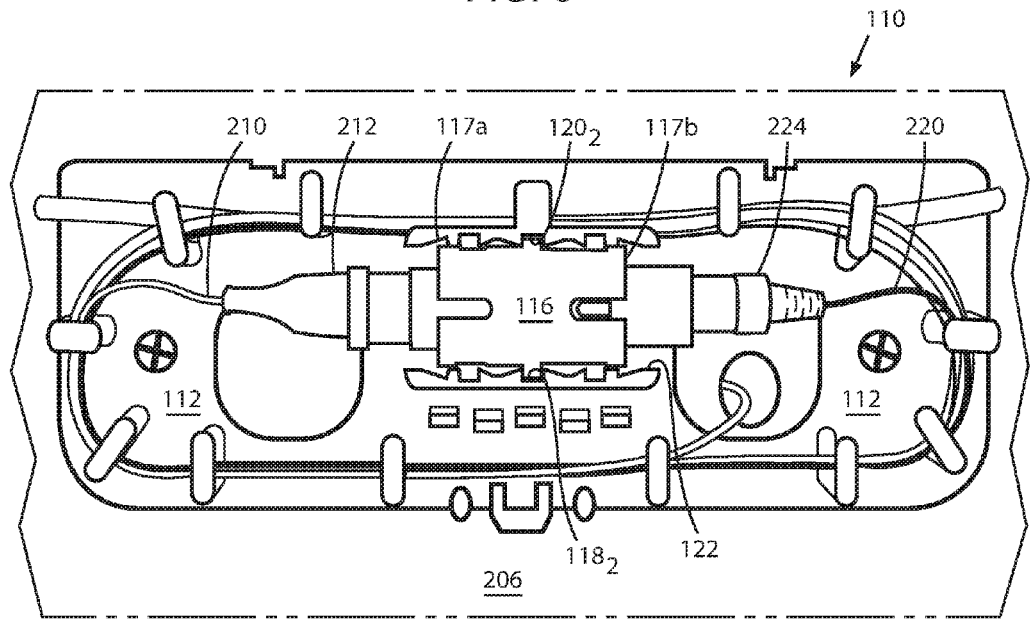
FIG. 6 is a view of the inventive module as in FIG. 5, wherein the adapter is mounted on the base at a second position.

In FIG. 6, the connector adapter 116 is mounted on the base 112 such that the adapter flanges 116a, 116b are inserted in a second pair of opposed guideways $118_2$, $120_2$ at the sides of the bracket 122. Thus, the adapter 116 is fixed at a second position centrally on the module base 112, and about 0.375 inch in the axial direction to the left of the first position in FIG. 5. Note that with the adapter 116 at the second position, the stored network fiber 220 can connect to the second port 117b at the right end of the adapter 116 without bending critically as the fiber approaches the port 117b from the right in FIG. 6. Moreover, the drop fiber 210 can still connect to the first port 117a at the left end of the adapter 116 without having to bend sharply as it approaches the port 117a from the left in FIG. 6.

Figure 7:
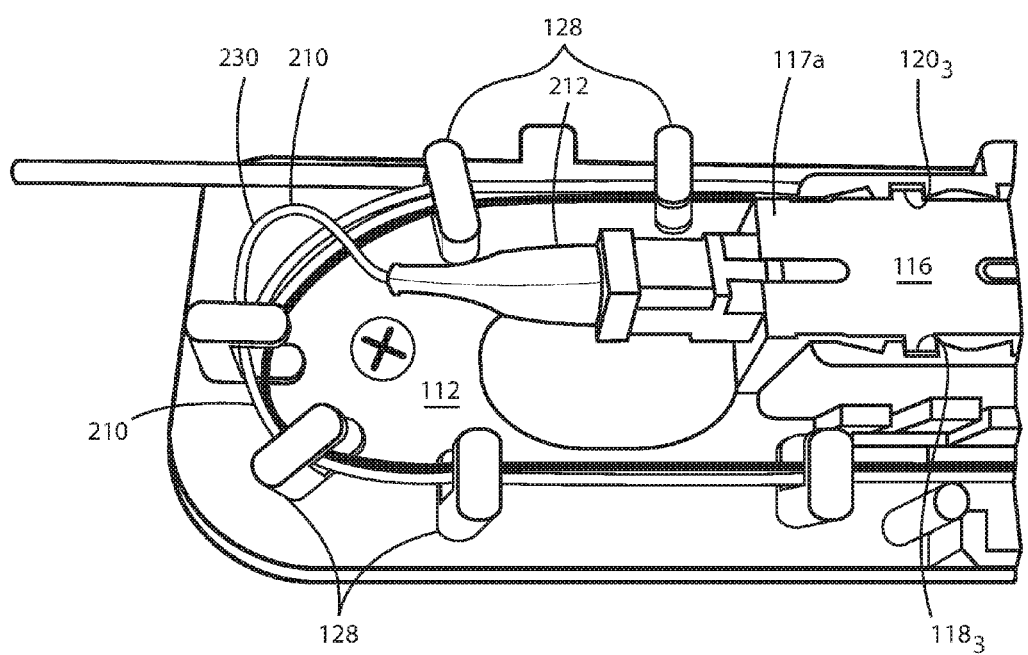
FIG. 7 is a view of the module as in FIG. 5, wherein the adapter is mounted on the base at a third position.

FIG. 7 shows the connector adapter 116 mounted on the module base 112 with the adapter flanges 116a, 116b inserted in a third pair of opposed guideways $118_3$, $120_3$ at the sides of the base bracket 122. In FIG. 7, the adapter 116 is fixed at a third position, about 0.375 inch in the axial direction to the left of the second position in FIG. 6. As shown, with the connector adapter 116 at the third position, it is no longer possible to connect the stored drop fiber 210 to the first port 117a of the adapter 116 without bending the drop fiber excessively (at 230) as it approaches the port 117a from the left in FIG. 7. As noted further below, however, any excess length or slack in the drop fiber 210 that would require the fiber to bend sharply to connect to the adapter 116, can be removed from inside the module 110 by urging the fiber a certain distance back into the associated living unit through the wall opening 208.

Accordingly, when the adapter 116 is mounted at the second position on the module base 112 as in FIG. 6, both the network fiber 220 and the drop fiber 210 can be terminated in connectors, routed about the fingers 128 on the base 112 for storage, and connected to corresponding ports at the ends of the adapter 116 without such bending as might damage or impair the performance of either fiber.

FIG. 8 shows the inventive module 110 with the cover 114 removed to expose a length of a second network fiber 320 and a length of a second drop fiber 310 routed over the area of the base 112 for storage, wherein the fibers are terminated in connectors 324, 312 for connection to the ports at the ends of the adapter 116. Note in FIG. 8 that by mounting the adapter 116 at the first position in the bracket 122 on the module base 112, neither fiber bends unsafely as it approaches and connects to the adapter 116.

FIG. 9 shows the inventive module 110 with the cover 114 removed to expose a length of a third network fiber 420 and a length of a third drop fiber 410 routed over the base 112 for storage, wherein the fibers are terminated in connectors 424, 412 for connection to the ports at the ends of the adapter 116. Note in FIG. 9 that by mounting the adapter 116 at the third position in the bracket 122 on the module base 112, neither fiber bends unsafely as it approaches and connects to the adapter 116.

In view of the above, it will be appreciated that the adapter 116 can always be mounted on the base 112 at such a position that when stored fibers are connected to the adapter, the fibers do not bend beyond a critical limit at which the fibers may be damaged or impaired. Typically, this limit is a minimum bend radius that is specified for the fibers, for example, five millimeters. Also note that any excess length or slack in the drop fiber can be taken up at various locations inside the associated living unit, rather than by sharply bending the drop fiber inside the storage module 110 itself. That is, compared to the network fiber, it is less of a problem to route the drop fiber inside the module 110 without incurring a sharp bend regardless of the position of the adapter 116 on the module base 112.

Other reasons to avoid sharp bends in fibers routed inside the module 110 for storage include, inter alia, (i) a possibility that the bends may project outside the area over the module base 112, so that the bent fiber is pinched between the module base 112 and the cover 114 when fastened to the base, (ii) a sharp fiber bend could make it difficult to insert or remove the associated fiber connector 212 or 224 into or out of the adapter 116 without damaging the fiber, and (iii) the network provider may consider any sharp fiber bends formed inside the module 110 to be unacceptable.

It will be appreciated that by constructing the base 112 of the storage module 110 so that the adapter 116 can be mounted at a selected one of multiple positions, the overall size of the module can be reduced to obtain a more pleasing appearance, and fibers stored inside the module can be routed to connect to the adapter without critically bending when the adapter is at one of the positions. Moreover, hallway cable installations in which the storage module 110 can be used (e.g., InvisiLight) may be performed with greater ease and in less time than in the past.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. An optical fiber storage module, comprising:
   a base;
   a cover constructed and arranged to be fastened to the base for enclosing optical fibers when routed over the base for storage;
   the base is constructed and arranged to mount a connector adapter at a selected one of multiple positions with respect to the base, the adapter having an axis and first and second ports at opposite axial ends of the adapter, so that when the adapter is mounted at one of the multiple positions, optical fibers of various lengths that are routed over the base for storage can connect to corresponding ports at the opposite axial ends of the adapter without bending beyond a specified critical limit; and
   wherein the base has a pair of opposed tabs that project upward from the base to form a bracket or slot for mounting the connector adapter, the bracket or slot has a number of pairs of opposed guideways formed in the opposed tabs, and each pair of opposed guideways corresponds to a different one of the multiple positions at which the adapter can be mounted with respect to the base when the adapter is inserted and seated in the pair of opposed guideways, and the multiple positions are along the axial direction of the adapter.

2. A fiber storage module according to claim 1, including a type SCA connector adapter dimensioned and configured for mounting in the bracket or slot on the base of the module at a selected one of the multiple positions.

3. A fiber storage module according to claim 1, including a type LCA connector adapter dimensioned and configured for mounting in the bracket or slot on the base of the module at a selected one of the multiple positions.

4. A fiber storage module according to claim 1, wherein the module measures not more than approximately 1.6 inches in height when the cover is fastened to the base.

5. A fiber storage module according to claim 1, including a number of fingers or tabs projecting upward from the base for retaining fibers that are routed over the base for storage.

6. A fiber storage module according to claim 1, wherein the base is constructed and arranged to route a bundle of network fibers to pass through the module, between opposite side edges of the base.

7. A fiber storage module according to claim 1, wherein the base has at least one opening for receiving a fastener for mounting the base to a wall.

8. A fiber storage module according to claim 1, wherein the base has at least one opening for allowing a drop fiber from an associated living unit to enter the module and connect to a corresponding port at an end of the connector adapter when the adapter is mounted in the bracket or slot on the base of the module.

9. A fiber storage module according to claim 1, wherein the bracket or slot on the base of the module is constructed and arranged to mount the connector adapter at a selected one of three positions along the axial direction of the adapter.

10. A fiber storage module according to claim 1, wherein adjacent ones of the multiple positions are about 0.375 inch apart from one another.

11. A fiber storage module according to claim 1, wherein the base and the cover of the module are made of polypropylene.

12. A fiber storage module according to claim 1, wherein the specified critical limit corresponds to a minimum bend radius of the fibers.

13. A fiber storage module according to claim 1, wherein the specified critical limit is a minimum bend radius of approximately five millimeters.

14. A fiber storage module according to claim 1, wherein each pair of opposed guideways in the bracket or slot on the base is dimensioned and formed to seat vertical flanges that project from opposite side walls of the connector adapter, intermediate the first and the second ports of the adapter.

15. A fiber storage module according to claim 1, wherein the module measures not more than approximately 6.0 inches in length when the cover is fastened to the base.

16. A fiber storage module according to claim 1, wherein the module measures not more than approximately 0.625 inch in depth when the cover is fastened to the base.

\* \* \* \* \*